United States Patent [19]

Burns

[11] 4,290,291

[45] Sep. 22, 1981

[54] APPARATUS FOR MAKING DYNAMOELECTRIC MACHINE STATORS

[75] Inventor: Richard D. Burns, Holland, Mich.

[73] Assignee: General Electric Company, Fort Wayne, Ind.

[21] Appl. No.: 91,082

[22] Filed: Nov. 5, 1979

Related U.S. Application Data

[62] Division of Ser. No. 835,294, Sep. 21, 1977, Pat. No. 4,188,712.

[51] Int. Cl.³ .......................................... H02K 15/02
[52] U.S. Cl. ................................. 72/316; 29/90 R; 29/406; 29/596; 72/363; 310/42
[58] Field of Search ............... 29/596, 609, 406, 90 R; 72/363, 457, 316; 310/42, 216, 217

[56] References Cited

U.S. PATENT DOCUMENTS

| | | | |
|---|---|---|---|
| 2,304,607 | 12/1942 | Sleeter | 29/596 |
| 2,464,107 | 9/1969 | Geisenhaver | 29/596 |
| 2,819,417 | 1/1958 | Glass | 29/596 X |
| 3,299,304 | 1/1967 | Hull | 310/217 |
| 3,493,794 | 2/1970 | Hickle | 310/42 |

*Primary Examiner*—Carl E. Hall
*Attorney, Agent, or Firm*—Ralph E. Krisher, Jr.

[57] ABSTRACT

Apparatus holds in alignment a stack of a plurality of loose laminations so that clamp bolt holes therein are held in an accurately aligned condition while the stack is compressed (in the vicinity of the bolt holes) between pads that simulate mounting pads in a compressor, and a means for applying a force localized in the bolt hole regions. The compressive forces simulate and closely approximate the compressive forces that ultimately will be applied to the bolt hole regions under the heads of mounting bolts in a compressor. Various eccentricities and dimensional variations between the bore and bolt holes are transferred to the bore, and while the stack is held with the preselected compressive forces, the bore is shaped with a roller burnisher so that it will be concentric relative to the bolt holes.

3 Claims, 4 Drawing Figures

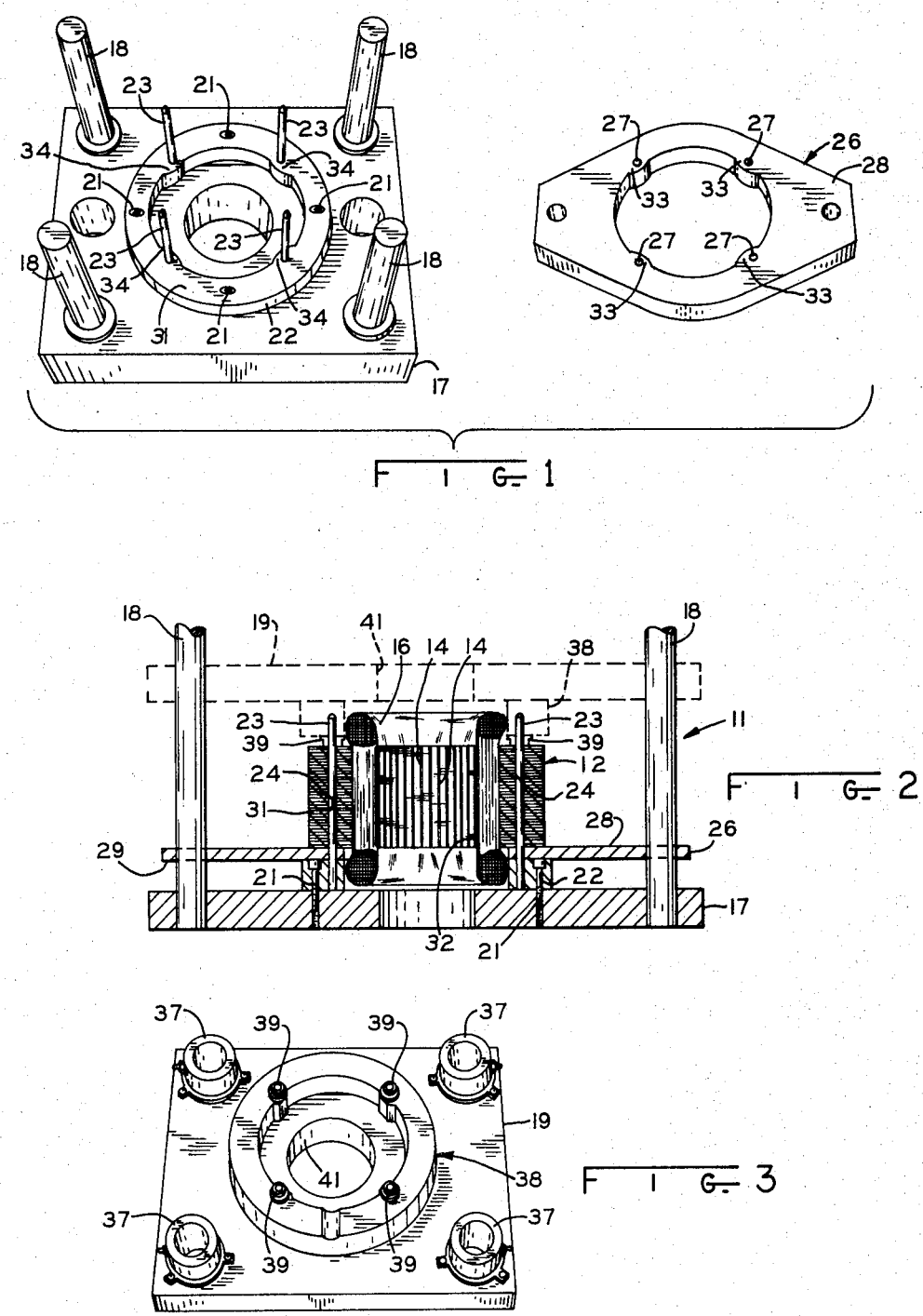

an apparatus that may be referred to to better understand

APPARATUS FOR MAKING DYNAMOELECTRIC MACHINE STATORS

CROSS REFERENCE TO RELATED APPLICATION

This application is a division of my co-pending and allowed application Ser. No. 835,294 which was filed on Sept. 21, 1977, now U.S. Pat. No. 4,188,712, the entire disclosure of which is incorporated herein by reference.

BACKGROUND OF THE INVENTION

The present invention relates to parts used in electric motors and, more particularly, to apparatus for making stator assemblies comprising a laminated magnetic core and windings that are primarily adapted for being bolted to mounting means within a hermetically sealed refrigeration compressor.

Substantial work has been done heretofore in order to prevent loss of bolt torque retention and to maintain a concentric air gap. For example, Hull U.S. Pat. No. 3,299,304 and Sisk U.S. Pat. No. 3,465,188 are both directed at solving this problem. While these patents primarily describe what are known as "bonded cores", unbonded cores are also described in the art by, e.g., British Pat. No. 1,192,791 which was published May 20, 1970. Moreover, specific methods aimed at maintaining straight and concentric bores are described in Reynolds U.S. Pat. No. 3,845,547, and Gerstle U.S. Pat. No. 3,834,013. In the interest of brevity, the entire disclosures of all of the patents just mentioned are now expressly incorporated herein by reference for background purposes.

Another patent which describes equipment and methods pertaining to axially compressed but unbonded cores is McMahon U.S. Pat. No. 3,605,257. Generally, the approaches suggested by the above-mentioned patents are less than fully satisfactory when unbonded cores are to be produced, and problems still remain in producing unbonded hermetic cores that will exhibit both good final mounting bolt torque retention and good concentricity after having windings placed thereon and then being bolted to compressor mounting means.

Accordingly, an object of the present invention is to provide new and improved apparatus that can be utilized to produce unbonded stator cores and/or stator assemblies that will exhibit good bore concentricity and good bolt torque (or tension) retention characteristics.

SUMMARY OF THE INVENTION

In carrying out the above and other objects of the invention, in one form thereof, I provide new and improved apparatus for use in conjunction with a method of aligning a stack of a plurality of loose laminations so that clamp bolt holes therein are held in an accurately aligned condition. The apparatus compresses the stack (in the vicinity of the bolt holes) between pads that simulate mounting pads in a compressor and means that apply a force localized in the bolt hole regions. The compressive forces applied to the bolt hole regions are preselected to simulate and closely approximate the compressive forces that ultimately will be applied to the bolt hole regions under the heads of mounting bolts when the core is bolted down in a compressor. The stack is initially aligned before the compressive forces are applied and while the laminations are free to shift relative to one another, various eccentricities and dimensional variations between the bore and bolt holes are transferred to the bore. Then, while the stack is held with the preselected compressive forces, the bore is shaped with a roller burnishing tool so that the bore will be concentric relative to the bolt holes.

In a form illustrated herein, apparatus embodying the invention includes a block having pins that mate with the bolt holes in the core, and the block simulates a compressor casting. The block is mounted in a four post die set, and the apparatus further includes a mating block which preferably includes hardened pads that will slide over the pins and simulate the contact area of bolts as the mating block is pressed against a core that has been previously placed over the bolt simulating pins. Means are also included for applying a compressive force to one of the blocks while other means constrain the other block from moving. The compressive force is transmitted to the core by the hardened pads, and the force exerted by each pad is about the same as or slightly greater than the force that will be applied by bolt heads in a compressor. The apparatus further includes a roller burnisher that establishes a concentric bore that is also perpendicular to the block and mating block.

Collateral manufacturing steps that may be carried out in conjunction with using apparatus embodying the present invention may include: (1) punching laminations from sheet or strip material, and preferably punching mounting bolt holes and wire accomodating slots at the same station so that the dimensional relationships between such slots and holes will be held to the tolerances built into the dies used at such station; (2) annealing the laminations to relieve stresses therein caused by the punching process, and preferably keeping the laminations in fixed orientation relative to one another; (3) breaking interlaminar bonds between adjacent laminations in the event that they have been annealed in a stacked condition and adjacent nitride or oxide layers have adhered to one another; (4) metering a number of laminations to form a stack of a desired height by means of weighing or by using a stack height selecting tool; (5) inverting the top lamination relative to the stack so that the punching burrs thereon are directed inwardly along the stack; (6) insulating the winding slots in the stack of loose laminations with any suitable apparatus as known in the art; (7) placing winding coils in the core slots; (8) washing and baking the core and windings; and (9) performing suitable tests such as surge, hi-potential, etc. on the wound core, after which it is ready for assembly into a compressor housing.

It seems to be most convenient to compress the core and establish bore to bolt hole concentricity as described hereinabove after the wound core has been washed and baked; but the compressing and bore working steps may be performed before the windings are inserted and after the stack has been established.

When the preferred process as described hereinabove is practiced, it no longer is a necessity to weld or adhesively bond the core (although such may also be done if desired), and thus savings may be realized in labor, material, welding atmosphere gas, and energy that would have to be used for welding or for curing adhesive material.

BRIEF DESCRIPTION OF THE DRAWINGS

FIG. 1 is an exploded perspective view of parts of an the apparatus described herein, and illustrates in some detail a lower block, a four post die set, and a stator lifting ring;

FIG. 2 is a side elevation, with parts in section, parts in phantom, and parts removed, of parts of apparatus that may be used in carrying out the invention;

FIG. 3 is an inverted perspective view of a mating or top block anchored to a top or sliding die shoe, these parts also being shown in phantom in FIG. 2.

DESCRIPTION OF THE PREFERRED EMBODIMENTS

Figure 4:
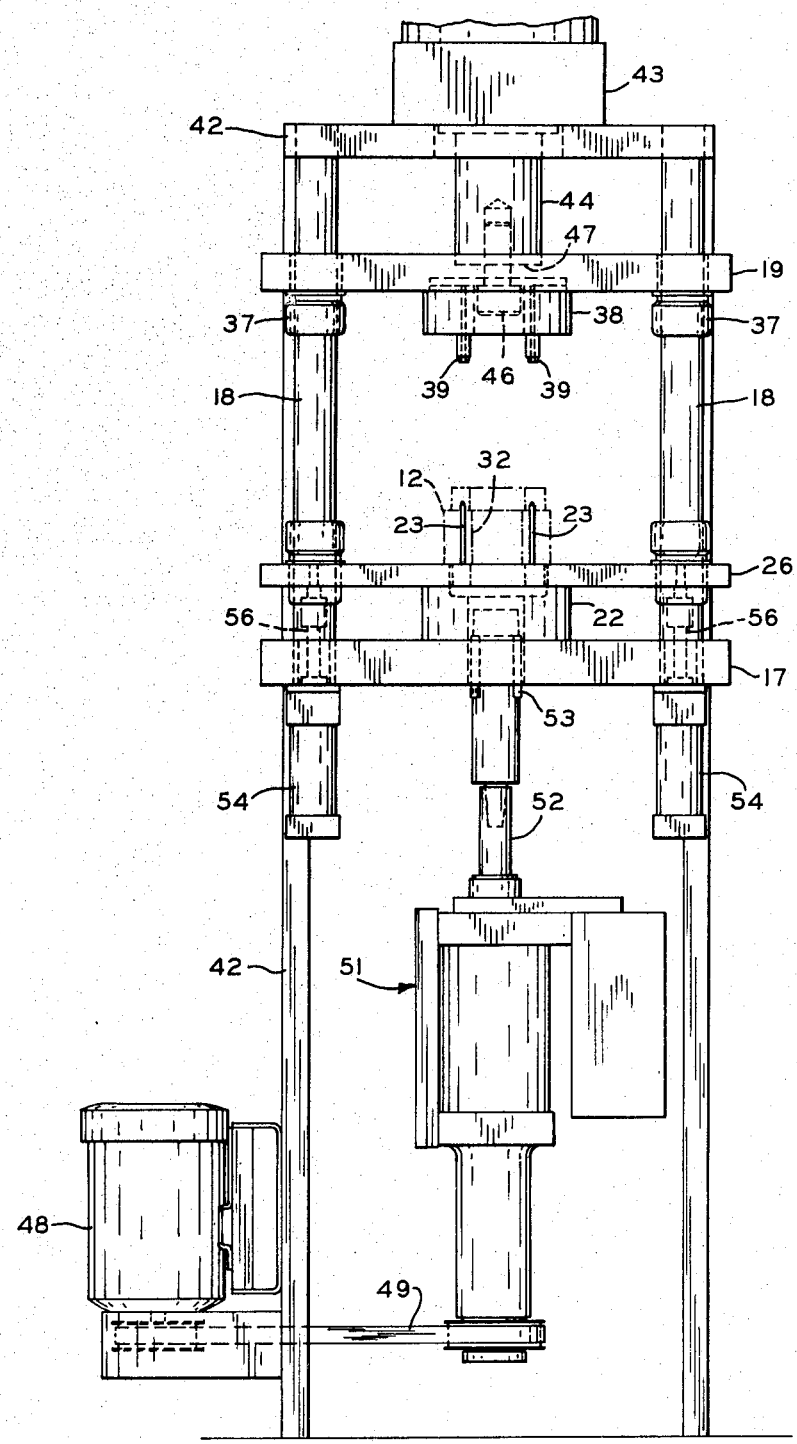
FIG. 4 is a side elevation of apparatus that may be used to practice the invention.

With initial reference to FIG. 2, apparatus 11 is illustrated having a stator 12 positioned therein, the stator including a laminated core 13 having a number of wire accommodating slots 14 therein, and windings 16 accommodated thereby.

The apparatus 11 includes a precision four post die set that includes a lower die shoe 17, four die posts 18 anchored in the shoe 17, and a top or sliding die shoe 19 (more details of which are revealed in FIG. 3, and discussed hereinbelow). Anchored to the lower shoe 17, by any suitable means such as bolts 21, is a lower block 22 which has anchored therein bullet nose pins 23 which simulate the number, size, and shape of bolts that will be used in mounting the stator 12 in a compressor housing. Good results have been obtained, for example, when the pins 23 are precision made to be about 0.001 inch (0.0254 mm) less in diameter than the diameter of the bolt holes 24 in the core 13.

When a stator lifting ring is to be used in conjunction with practicing my process, the stator lifting ring 26 (see FIGS. 1 and 2) is positioned over the lower block 22, with the holes 27 in ring 26 accommodating the pins 23. The upper and lower faces 28, 29 of the lifting ring 26 are ground so as to be flat and parallel to one another, and the lower block 22 is also ground to have flat and parallel faces; so that when the lower face 29 of the ring 26 seats on the upper face 31 of block 22, the upper face 28 of ring 26 will be parallel (within machining accuracies and tolerances) to a plane perpendicular to the die posts 18 and to the bore 32 of stator 12 after it is positioned thereover.

The lifting ring 26 includes four regions 33 that simulate the mounting pads of a compressor; and similar compressor mounting pad simulation regions 34 are provided on the block 22 so that the core 13 will rest on simulated mounting pad regions whether the process followed includes or omits utilization of the lifting ring 26.

After the lifting ring 26 has been placed over the pins 23 (or after a decision has been made to not use the ring 26); the core 13 is placed on the pins 23 and the lower face bears upon the compressor mounting pad simulating regions 33 or 34, as the case may be.

It should here be noted that the core 13 may or may not at this time have windings 16 thereon and, further, if not wound; may or may not have ground insulation in the slots thereof (although it is preferred that the core at least be insulated, with the insulators helping to hold the core laminations together in a stack).

It is important however, that the individual laminations 36 be sufficiently loose relative to one another to be able to shift laterally within the stack. Then, when the close tolerance pins 23 enter the bolt holes 24 of individual laminations, the laminations will be free to shift relative to one another (if necessary) so that the entire stack of laminations will be laterally positioned on the pins 23. However, as will be understood by persons skilled in the art, other parts of the various laminations may not be aligned with one another. For example, as described in Bair U.S. Pat. No. 3,762,198 (dated Oct. 2, 1973); as lamination stock is advanced through punch presses, stretching or elongation of the stock may occur. Since the bolt holes 24 and final bores 32 of laminations 36 are usually punched at different stations, any such elongation occurring between the stations will result in some eccentricity between the bore and the bolt hole circle. Furthermore, since different dies are used at different punch press stations; respective die manufacturing tolerances may be cumulative in effect, and further contribute to eccentricities between the bore and bolt holes (or bolt hole circle).

The actual outer peripheral shape of the laminations 36 is not important for the purposes of the present discussion (or the present invention), but the laminations 36 may be: round and configured substantially as shown in Hull U.S. Pat. No. 3,299,304 (issued Jan. 17, 1967); or generally rectangular or square and configured as shown, for example, in Gerstle U.S. Pat. No. 3,834,013 (issued Sept. 10, 1974).

It is emphasized that, regardless of the shape of the laminations 36, eccentricities between the bore and bolt hole circle in the final lamination may and usually do occur, and it is not of real importance as to what causes the problem. For example, it is not of great importance whether the cause for the eccentricities is due to strip material stretching, forces exerted on lamination teeth by windings, staggered laminations, or due to other reasons as variously proposed in the hereinabove referenced Reynolds, Gerstle, Bair, Hull, or Bair U.S. Pat. No. 3,762,041 (the entire disclosures of all which are incorporated herein by reference).

Although the problem of nonconcentric bores has been identified, and various solutions have been hopefully suggested, it has now been found that good results can be consistently attained by accurately aligning the bolt holes (and thus the bolt hole circles) and relatively shifting the laminations as may occur when the bolt holes are aligned so as to cause eccentricities between the bolt circles and bore to occur at the bore; simulating the mounting conditions and stresses that the core will experience in a compressor housing; and then while the core is so stressed-removing the bore eccentricities while preventing the laminations from shifting relative to one another. In other words, after the laminations are mutually located in aligned fashion at the bolt holes and dimensional variations are concentrated at the bore, and while the core is prestressed, the bore is made concentric with the bolt hole circle. This approach is markedly different from: previous ones that have been directed to shaping or straightening a bore while the laminations could shift at the bolt holes or while the core was not prestressed and located in a precise manner; previous ones that sought to make the core as solid and rigid as possible, and may or may not have included a bore shaping step; and previous ones that concentrated on correcting tooth tip irregularities at the bore.

With all of the above in mind, reference is now again made to FIGS. 1, 2 and 3 of the drawings. After the stator 12 is positioned in parallelism on the mounting pad simulating regions 33 (or 34), the sliding die 19 of FIG. 3 is positioned thereover on die posts 18, with bushings 37 surrounding the posts 18. When in this position, the mating block 38 (which is fastened to die 19) overlies the stator, and the pins 23 are positioned to enter hardened pads 39 which are carried on block 38 and which simulate bolt heads that contact the core face when it is bolted into a compressor housing. Then, as die 19 moves toward die 17, pins 23 enter not shown hardened bushings that are carried in block 38.

These bushings are provided to reduce wear of parts, and thus ensure that close dimensional tolerances will be maintained even after many cycles of apparatus operation.

Thereafter, any suitable press (e.g., one using a hydraulic ram) forces the upper die and lower die toward one another so that the core 13 is compressed in the bolt region by a force closely approximating the compressive force that will be applied by bolt heads when the core is mounted in a compressor housing.

For example, when a one quarter inch (6.35 mm) hex-head bolt or a number 8 hex-head bolt is to be used, for mounting (without a washer under the head); and the bolt is to be torqued down with a force of forty-five to fifty-five inch-pounds; the bolt head will exert an axial force of about 1500 pounds (682 kg) at each bolt hole. I have found that forcing the dies together with five tons of force results in a force of about 1500 pounds being exerted by pads 39 on the core.

Thereafter, I pass a roller burnisher through opening 41 in the upper die shoe 19, and burnish out the various eccentricities in the stator bore 32; then separate the die shoes; and then lift the stator 12 from the lower die with lifting ring 26.

FIG. 4 shows a preferred embodiment of the invention. For the sake of simplicity and clarity, the same reference numerals are used for components in FIG. 4 that are either identical to, or the same in function, as component parts described in full in conjunction with FIGS. 1–3. Thus, those parts will not be further described in conjunction with FIG. 4 except to call attention to their presence. Thus, the apparatus of FIG. 4 includes, mounted on a machine frame 42, four die posts 18, an upper die shoe 19 and lower die 17; upper and lower blocks 38, 22; four pins 23 carried by block 22; hardened pads 39 suspended from block 38; and a lifting ring 26.

As will be appreciated from a review of FIG. 4, a hydraulic ram 43 (although a pneumatic or other type of prime mover could be used) is supported at the top of the frame 42 and the rod 44 thereof is interconnected with the upper block 38 by means of a bolt 46. On its upward stroke, the ram 43 raises the block 38 and thus the die shoe 19. On the other hand, as the ram 43 extends, it bears against a countersunk surface 47 of the upper die and moves the die 19 along with block 38 into compressive engagement with the face of the stator 12.

A hydraulic motor 48 is also supported on the frame 42 and this motor supplies power through belt 49 to a Hydramat drill unit 51 to which air power is also supplied through a not shown conduit. When air is supplied to the drill unit 51 (after upper die shoe 19 has closed on the stator 12), the drill unit automatically extends the shaft 52 upwardly so that a roller burnisher attached to the upper end of shaft 52 rises into the bore 32. During this time, the burnisher 53 is rotated by the shaft 52 and eccentricities in the bore 32 are burnished out in the same manner as described hereinabove.

The drill unit 51 then lowers the burnisher 53, ram 43 raises die shoe 19; and two stripper cylinders 54 are actuated which thereupon extend rods 56, and raise lifting ring 26 so as to elevate the stator 12 and strip it from the pins 23.

As noted hereinabove, the roller burnisher may be of any of those types commonly used in the industry and may be, for example, one obtained from the source identified in Reynolds U.S. Pat. No. 3,845,547—i.e., the Gustaf Wiedeke Company of Dayton, Ohio.

Apparatus such as that shown in FIG. 4 has now been used successfully to produce stator cores having desired bore diameter limits of from 2.3985 inches to 2.4015 inches (60.923 to 60.998 mm), having a core or stack height of up to one and three quarter inches (44.4 mm), and horsepower ratings of from one-eighth to one-third (93.25 to 248.7 watts) output. Those cores have then been positioned on compressor mounting pads, centered with an expandable fixture or mandrel of the type shown, for example, in Geisenhaver U.S. Pat. No. 3,464,107 (issued Sept. 2, 1969); and bolted down essentially as described in the Geisenhaver patent. Experience has now shown that rigid control of the parallelism of the die shoes 17, 19, and blocks 22, 38 with a rugged frame as shown at 42 (in FIG. 4), and rigid mounting of drill unit 51 on the frame 42 is also important. It is for this reason that frame 42 is part of a Hannifin Hydraulic Press. The rigid mountings just discussed result in properly finished cores which can be assembled into compressors with virtually no air gap rejects. In this connection, it should be emphasized that "air gap" failures or rejects at the point of compressor assembly can hardly be tolerated, and reject rates of more that about 1% would be completely unacceptable and essentially preclude the use of a process such as the one of the present invention in a competitive high volume production motor industry.

Trials involving cores made by the process taught herein have now also shown that successful practice of the invention with a roller burnisher seems to require attention to and close control of other manufacturing steps that are followed when manufacturing stator laminations and cores.

For example, early trials that were made resulted in non-uniform results until finally it was determined that initial punching dimensional tolerances and annealing practices could prevent successful practice of the invention.

More specifically, with cores sized as described hereinabove, the bearingizer would flare the bore of the core when the total indicated runout (TIR) of the individual laminations exceeded 0.011 of an inch as measured from the center of the winding slots (or bolt hole centers) to the bore. On the other hand, more consistent results were obtained after a lamination die was carefully repaired and reworked so that dimensional tolerances of plus or minus 0.0002 of an inch of the nominal design dimensions were held and the TIR between winding slots and bores (in laminations made with the reworked die) was only 0.003 of an inch. Cores made from these more accurately dimensioned laminations could then be more consistently bearingized without distorting or flaring the bore of the core. Thus, while cores made of laminations having 0.011 of an inch TIR were not generally suitable for practicing the invention; cores made of laminations having 0.003 of an inch TIR were-and the amount of TIR that would be tolerable for bearingizing (also called roller burnishing) would appear to be between about 0.003 and about 0.011 of an inch (about 0.0762 mm to 0.2794 mm).

Still further trials revealed that annealing practices could introduce bore distortions and resulting bore eccentricities that could not be properly and reliably remedied by practicing the invention. For example, trials showed that laminations produced to have 0.003 of an inch TIR could still be made into cores having air gap failures if the laminations had been carried through an annealing oven while being supported from the bore on horizontally disposed supports or bars. It now appears that the weight of the lamination material can stretch or elongate the bore when the lamination is so supported at elevated annealing temperatures.

Further trials confirmed that laminations produced to 0.003 of an inch TIR and also annealed while laying flat (so that the bore was not stressed during anneal) could be produced into good stators by practicing the present invention. In other words, when these other processes are controlled or modified to be as just described, it appears that not more than about one out of one hundred stators produced by practicing the invention will have air gap problems when being assembled into a compressor. The trials referred to above have also shown that the aligning pins may be of 0.187 or 0.188 of an inch in diameter (plus or minus 0.0002 of an inch) for bolt holes of 0.190 of an inch diameter (plus or minus 0.0002 of an inch) and still yield good results when the annealing procedures and slot to bore TIR are controlled in the manner discussed hereinabove.

In addition to the savings in material and energy, as discussed hereinabove, motors manufactured according to the teachings of the present invention exhibit good bolt torque retention, even after compressor dehydration processes. Thus, cores made as taught herein, exhibit desirable torque retention characteristics of the type described in the above-referenced Hull patent, and yet do not need to be "bonded".

While in accordance with the patent statutes, I have described what at present are considered to be a preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. Apparatus for use in the manufacture of a bolt-down stator comprising a stack of laminations having a number of conductor accommodating slots, a plurality of mounting bolt holes, and a central bore concentric with the bolt hold locations wherein the dimensional variations between the mounting bolt holes and the central bore are less than eleven thousandths of an inch; the apparatus comprising: a frame; a pair of relatively movable members supported by said frame that simulate ultimate mounting means and mounting areas; press means, supported by said frame, for moving the relatively movable members together and for applying forces to the stack of laminations that simulate ultimate stator mounting forces for a preselected period of time; alignment pins carried by one of said movable members for entering the bolt holes wherein the pins are accurately dimensioned to closely fit the bolt holes and wherein the pins have a diameter that is not more than about three thousandths of an inch smaller than the diameter of the bolt holes; and means, supported by said frame, for shaping the bore of the stack of laminations within the preselected period of time while the stator mounting forces are being simulated by said means for moving and for applying forces, and while said alignment pins are disposed within bolt holes of the laminations.

2. The apparatus of claim 1 wherein the means for shaping the bore is a roller burnisher.

3. The apparatus of claim 1 wherein about fifteen hundred pounds of force are applied to each bolt hole region.

* * * * *